(12) United States Patent
Shankar et al.

(10) Patent No.: US 8,909,943 B1
(45) Date of Patent: Dec. 9, 2014

(54) VERIFYING IDENTITY

(75) Inventors: Umesh Shankar, New York, NY (US); Daniel Belov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/604,862

(22) Filed: Sep. 6, 2012

Related U.S. Application Data

(60) Provisional application No. 61/531,198, filed on Sep. 6, 2011.

(51) Int. Cl.
| | | |
|---|---|---|
| G06F 11/30 | (2006.01) | |
| G06F 12/14 | (2006.01) | |
| G06F 17/30 | (2006.01) | |
| H04L 29/06 | (2006.01) | |
| H04L 9/08 | (2006.01) | |
| G06F 21/60 | (2013.01) | |
| G06F 21/62 | (2013.01) | |

(52) U.S. Cl.
CPC .............. *G06F 21/602* (2013.01); *G06F 21/62* (2013.01)
USPC ............. 713/193; 713/165; 713/167; 726/28; 380/281

(58) Field of Classification Search
CPC ..... H04L 63/10; H04L 63/101; H04L 63/102; H04L 63/104; H04L 63/105; H04L 9/088; H04L 9/0822; H04L 9/0813; H04L 9/0838; H04L 9/0844; H04L 29/06823; H04L 29/06829; H04L 29/06843; H04L 29/0685
See application file for complete search history.

(56) References Cited

U.S. PATENT DOCUMENTS

| | | | |
|---|---|---|---|
| 7,877,781 | B2 | 1/2011 | Lim |
| 2006/0206462 | A1 | 9/2006 | Barber |
| 2007/0192140 | A1 * | 8/2007 | Gropper ............................ 705/3 |
| 2007/0208746 | A1 | 9/2007 | Koide et al. |
| 2007/0244863 | A1 * | 10/2007 | Adams et al. ..................... 707/3 |
| 2007/0250486 | A1 | 10/2007 | Liao et al. |
| 2008/0033954 | A1 | 2/2008 | Brooks et al. |
| 2008/0168135 | A1 | 7/2008 | Redlich et al. |
| 2009/0106207 | A1 | 4/2009 | Solheim et al. |
| 2009/0106271 | A1 * | 4/2009 | Chieu et al. ................... 707/100 |
| 2010/0185611 | A1 | 7/2010 | Liao et al. |
| 2013/0212707 | A1 * | 8/2013 | Donahue et al. ................ 726/29 |

OTHER PUBLICATIONS

Umesh Shankar, "Security and Data Integrity in Google Health", May 2010, Admitted prior art from U.S. Appl. No. 13/110,323.*

* cited by examiner

*Primary Examiner* — Andrew Nalven
*Assistant Examiner* — Quy Pham
(74) *Attorney, Agent, or Firm* — Fish & Richardson P.C.

(57) ABSTRACT

Techniques for encrypting documents in a search index may include: receiving a document for inclusion in a search index of a search system, where the document has an associated access control list (ACL), and the ACL includes data for use in restricting access to the document to users of the search system having credentials that match corresponding data in the ACL; encrypting the document using a first key to produce an encrypted document; generating a wrapped key for the document by encrypting both the first key and the ACL using a second key; and storing, along with the search index, the encrypted document in association with the wrapped key and an identifier for the document.

13 Claims, 9 Drawing Sheets

VERIFYING IDENTITY

CROSS-REFERENCE TO RELATED APPLICATION

Priority is hereby claimed to U.S. Provisional Application No. 61/531,198, which was filed on Sep. 6, 2011. The contents of U.S. Provisional Application No. 61/531,198 are hereby incorporated by reference into this disclosure.

BACKGROUND

This specification relates generally to verifying identity, particularly to verifying identity in information retrieval.

Search engines identify resources (e.g., images, audio, video, World Wide Web (Web) pages, text, documents) that are relevant to a user's needs and present information about the resources in a manner that is useful to the user. A search engine may be used to conduct a search of a source of data, e.g., the Internet, a social network, an intranet, non-networked storage, other public or private content, and the like. A search engine receives a search query from a user and returns search results responsive to the search query.

SUMMARY

Example techniques for encrypting documents in a search index may include the following operations: receiving a document for inclusion in the search index of a search system, where the document has an associated access control list (ACL), and where the ACL includes data for use in restricting access to the document to users of the search system having credentials that match corresponding data in the ACL; encrypting the document using a first key to produce an encrypted document; generating a wrapped key for the document by encrypting both the first key and the ACL using a second key; and storing, along with the search index, the encrypted document in association with the wrapped key and an identifier for the document. The example techniques may include one or more of the following example features, either alone or in combination.

Examples of operations that may be used with the foregoing technique may include: identifying the encrypted document in response to a search query received by the search system from a computing device; and decrypting the encrypted document using the wrapped key.

Examples of operations that may be used with the foregoing technique may also include: receiving a credential associated with a user who provided the search query; decrypting the wrapped key using the second key to produce the first key and the ACL; determining if the user is authorized to access the document based on the credential and the ACL; and, in a case that the user is authorized to access the document, decrypting the encrypted document using the first key.

An example of another operation that may be performed with the foregoing technique may include generating the first key from a random or pseudo-random data.

In the foregoing technique, determining if the user is authorized to access the document may include examining the ACL to see if a user corresponding to the credential, or a group of which the user is a member, appears in the ACL. The user is authorized to access the document if user or group of which the user is a member appears in the ACL. In a case that the user is not authorized to access the document, the document may be excluded from search results returned in response to the search query. In the foregoing technique, the credential may include an identifier associated with the user.

In the foregoing technique, the second key is a master key that is usable to encrypt document associated with a single service; and the operations also include confirming that the document is associated with the single service.

An example of a technique for decrypting documents in a search index may include the following operations: receiving a search query from a user of a search system, where the search query includes a credential associated with the user; identifying a document in a search index based on the search query, where the document is encrypted using a resource encryption key and is stored in association with a wrapped key that includes data used to decrypt the document; decrypting the wrapped key using a master key to produce the resource encryption key and an access control list (ACL) associated with the document; determining if the user is authorized to access the document based on the credential and information from the ACL; in a case that the user is authorized to access the document, decrypting the encrypted document using the first key; and following decryption, outputting the document in response to the search query.

In the foregoing technique, determining if the user is authorized to access the document may include examining the ACL to see if the credential appears in the ACL. The user is authorized to access the document if the credential appears in the ACL. In a case that the user is not authorized to access the document, the document may be excluded from search results returned in response to the search query. In the foregoing technique, the credential may include an encrypted identifier associated with the user.

Advantages of the foregoing techniques may include providing security, through encryption, of search index information. Additionally, the foregoing techniques enable separation of the search system and the encryption system, which may lead to greater security than if the two were not separated.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
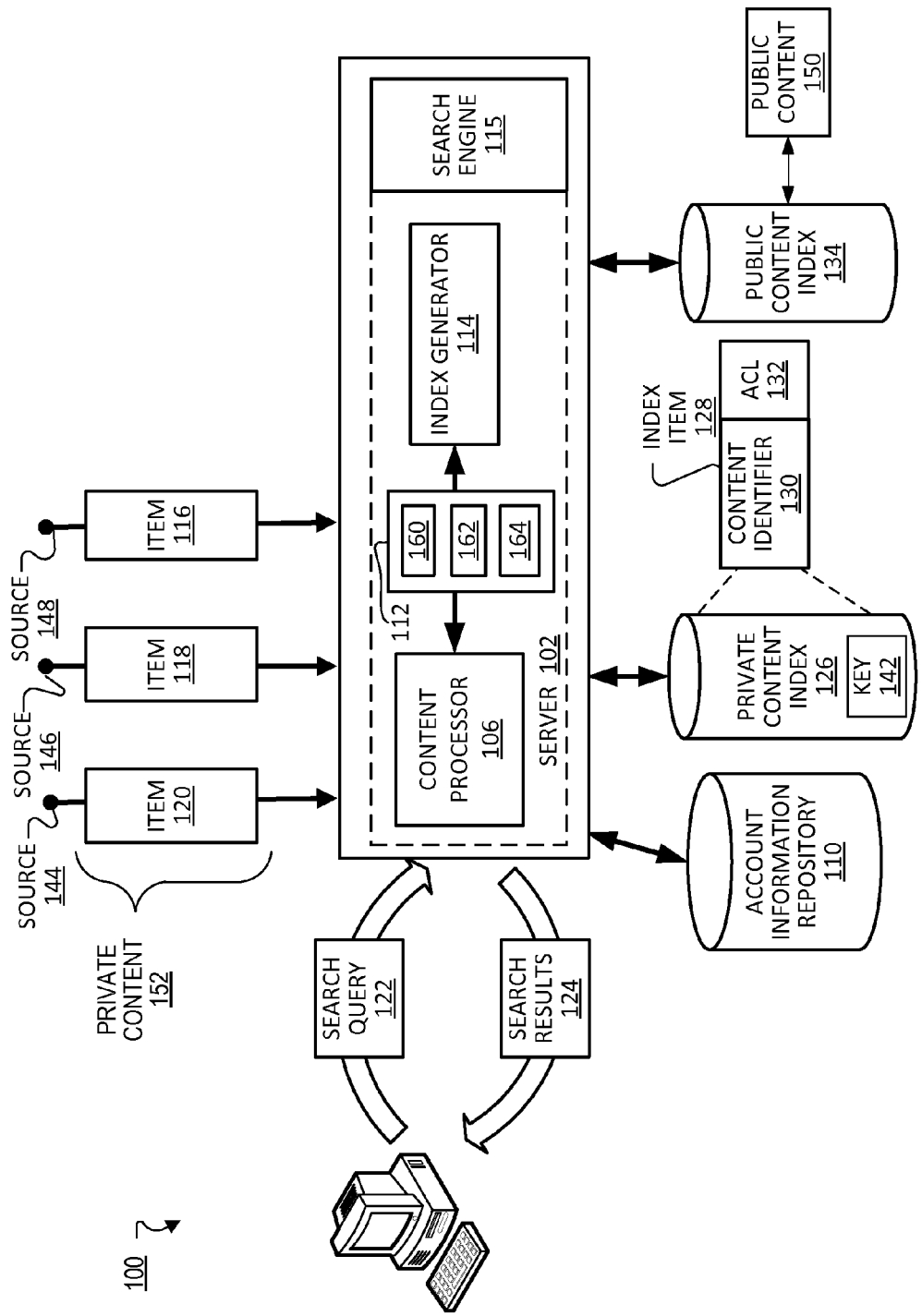
FIG. 1 is a diagram of an example of a search system.

Described herein is a search system configured to verify the identity of a searcher in order to confirm that content identified in response to a search query may be provided to that searcher. More specifically, in some systems, not all content is available for viewing by all searchers. For example, some searchers may be prohibited from accessing content that is designated as confidential. The processes described herein may be used to verify that a searcher is authorized to view content before that content is sent to the searcher as search results.

Example processes described herein use wrapped keys in order to perform the foregoing verification. In an example, processes for performing encryption using wrapped keys include generating an index for text in documents and an associated database of documents indexed by document identifier. In some examples, the database is part of the index or the two may be one in the same. According to the processes, a document is received for inclusion in the index. The document has an associated access control list (ACL), which includes data that restricts access to the document to users of the search system having acceptable credentials. The processes encrypt the document using a first key to produce an encrypted document, generate a wrapped key for the document by encrypting the first key and the ACL using a second key, and store the encrypted document in the index in association with the wrapped key and the document identifier. In this example, the second key is a master key that is used to encrypt individual keys. For example, the master key may be used by a central authority to perform key encryption for documents from a specified service.

By way of example, a document (referred to here as "d") is received for indexing and inclusion in the index. A key (referred to here as "K") is created for document d. In this example, the key is randomized, e.g., created from a random string of bits. The document d is encrypted with the key K, resulting in an encrypted document (referred to here as "E_K (d)"). The key K and information from the ACL (e.g., the ACL or a portion thereof) are encrypted with a master key (referred to here as "M"). This encryption may be performed by an entity other than the entity that performed the encryption with key K, or by the same entity. For example, the encrypting entity may be a third-party server. The result that is returned from the entity (referred to here as "E_M(K, ACL)") is known as a wrapped key ("Wd" for short). The original key K is not stored; however, E_K(d) and Wd are stored in the database in association with the document ID of the document that was encrypted.

In response to a search query, a list of document IDs is obtained from the search index. In this example, each such document is decrypted in order to verify the identity of a searcher and thereby confirm that providing the searcher with content from the document will not violate security constraints put on the document. Decryption processes may include receiving a credential from the searcher, unwrapping (e.g., decrypting) a wrapped key using the second key to produce a first key and a document ACL, and determining if the searcher is authorized to access the document by determining if the credential is in the ACL. If the searcher is authorized to access the document, the encrypted document is decrypted using the first key. If the searcher is not authorized to access the document, that document may not become part of the search results that are returned in response to the search query.

Continuing with the foregoing example, a searcher's credential (referred to here as "C") is received. In some examples, the credential may result from inputting a username and a password, and may take the form of a cookie or token. The credential may be, e.g., an encrypted and signed user ID, e.g., an input username and password. E_K(d) and Wd are retrieved, and Wd is sent to the entity that performed the encryption using the master key M. That entity uses the master key M to decrypt Wd into (e.g., to obtain) K and ACL. The entity checks that the searcher authenticated by C is in ACL, e.g., that the searcher corresponding to credential C is permitted access to the document by ACL. K and ACL are returned, e.g., to the search engine. The search engine uses K to decrypt E_K(d) (the encrypted version of document d) in order to obtain the contents of d, obtain snippets thereof, and return those snippets as part of search results.

Advantageously, in some implementations, so long as the right ACLs are used at indexing, the search system will not inadvertently show unauthorized results to a searcher due to, e.g., a problem with the search system The processes described herein, including that described above, may be implemented in an appropriate network system, with appropriate devices and computing equipment. An example of such a system is described below with respect to FIGS. 1 and 2.

FIG. 1 is a diagram of an example of a search system. In this regard, FIG. 1 shows an example system 100 that can be used to search for private content 152 and public content 150. In this context, private content can include access-restricted content. Access to the private content may be limited by an ACL associated with that content. Public content, generally, refers to content to which access is not restricted.

System 100 includes server 102. Server 102 includes content processor 106 which, in some examples, is a crawling engine. Content processor 106 is configured to determine private content 152 from sources 144, 146, 148, including, e.g., social networking Web sites, picture hosting Web sites, online e-mail providers, and so forth, that content processor 106 is authorized by users to access. In this regard, users can enable/disable access to their private content, e.g., users can prevent their private content from being accessed.

In the example of FIG. 1, private content 152 includes a collection of items, e.g., items 116, 118, 120. Content processor 106 may be configured to search sources 144, 146, 148 of private content to retrieve items 116, 118, 120. In another example, sources 144, 146, 148 may send items 116, 118, 120 to content processor 106, e.g., at pre-defined time intervals and/or when sources 144, 146, 148 obtain new items, including items that were not previously sent to content processor 106.

System 100 also includes account information repository 110. Account information repository 110 is configured to store information for accessing accounts associated with sources 144, 146, 148. In an example, a user is provided with the option of specifying which private content may be determined by the content processor and/or of specifying that only public content 150 be searched for a user.

Before storing items 116, 118, 120 of private content 152, content processor 106 may be configured to translate content in items 116, 118, 120 to a normalized format. Generally, normalization includes reformatting disparate types of content items into a standardized structure.

In this example, content processor 106 generates normalized items 160, 162 164 by normalizing the content of items 116, 118, 120. Content processor 106 groups together normalized items 160, 162, 164 into a collection, namely, normalized private content 112. In this example, normalized private content 112 is sent to other modules in server 102 as a data feed, e.g., rather than individually sending normalized items 160, 162, 164.

Server 102 also includes an index generator 114. Index generator 114 is configured to index private content 152 and to index public content 150. Index generator 114 is also configured to update these indexes with new information, including new content and new information about restrictions on access to the indexed content. Server 102 also includes search engine 115.

Search engine 115 is for searching indexed private and public content. Search engine 115 may include, e.g., a crawling engine to crawl content, an indexing engine to index crawled content, and a ranking engine to rank content in the index (not shown). In some implementations, content processor 106 may be part of the crawling engine and index generator 114 may be part of the indexing engine of search engine 115 (as depicted graphically by the dotted line in FIG. 1). In other implementations, content processor 106 and index generator are separate from, e.g., outside of, search engine 115.

In the example of FIG. 1, index generator 114 generates private content index 126, which indexes private content 152. For example, using normalized items 160, 162, 164, index generator 114 generates corresponding index items, e.g. 128, and stores the index items in private content index 126.

Each indexed item, e.g. 128, includes a content identifier 130 and an ACL 132. Content identifier 130, includes, e.g., portions of an item of private content that index generator 114 has determined are relevant for identifying and/or for searching the item of private content, information describing the item, keywords for the item, and/or a unique identifier for the item.

An ACL, e.g. 132, is associated with each content item. The ACL includes searcher data (restricts) identifying individuals who are authorized to access the corresponding item of content (here, 128) and/or groups of individuals who are authorized to access the corresponding item of content. In an example, index generator 114 identifies users and groups that are permitted to access corresponding content items in the search index. This information may be obtained, e.g., from the items themselves or from accounts or other information that are accessible, e.g. on a social networking service. For example, a sender of a content item is typically permitted future access to that content item. Likewise, a group of individuals associated with a same account of a social networking service may be permitted access to the same information. Index generator 114 incorporates the appropriate individual and/or group restricts into ACL 132.

Items 116, 118, 120 of private content 152 may include sensitive and/or confidential information (collectively referred to herein as confidential information, without limitation, for purposes of convenience). In an example, item 116 includes such confidential information. When generating content identifier 130 of index item 128, index generator 114 includes at least a portion of the confidential information in content identifier 130. To promote secure storage of the confidential information in index item 128, index generator 114 may encrypt content identifier 130 using an encryption key, namely, key 142. Prior to including index item 128 in a search, search engine 115 may, optionally, determine that a user requesting the search has permission access to confidential information in content identifier 130.

In still another example, an index item 128 may be associated with a wrapped key. Generally, a wrapped key includes an encrypted key. In this example, to unwrap (e.g., decrypt) the wrapped key, server 102 sends the wrapped key to another security system (not shown in FIG. 1). The other security system sends an unwrapped key to server 102. The unwrapped key is used by search engine 115 to decrypt content. Use of wrapped keys to further control access to search results is described below with respect to FIGS. 3 to 8.

Index generator 114 also generates public content index 134 for public content 150, including, e.g., publicly accessible Web pages, publicly accessible Web sites, publicly accessible documents, and other publicly accessible information. Index generator 114 may generates public content index 134 by crawling the World Wide Web and indexing Web pages. Items of public content need not include ACLs if those items have no access restrictions. Alternatively, items of public content may have associated ACLs indicating, e.g., that there are no restrictions on access. In cases where access to public content is restricted, appropriate restricts may be incorporated into those ACLs.

In a variation of the system shown in FIG. 1, index generator 114 may generate a single index for indexing private content 152 and public content 150, e.g., rather than generating separate indexes 126 and 134. In another variation of the system shown in FIG. 1, index generator 114 may generate individual private and public content indexes for users of system 100, e.g., rather than generating private and public content indexes 126 and 134, which may index private content 152 and public content 150. In an example, index generator 114 generates an index (not shown) indexing items of private content that are accessible to a particular user. In this example, index generator 114 also generates another, different index (not shown) indexing items of public content that are also accessible to the particular user.

In the example of FIG. 1, system 100 also includes client device 104. Using client device 104, a user (not shown), submits a search query 122 to server 102. In this example, search query 122 includes one or more search terms.

Search engine 115 receives search query 122. In the example of FIG. 1, search engine 115 searches both private content index 126 and public content index 134. As described below, search engine 115 determines which items 116, 118, 120 of private content 152 the user has permission to access.

To this end, search engine 115 scans ACLs of the indexed items in private content index 126 to determine which of items 116, 118, 120 of private content 152 are accessible to the user submitting search query 122. In this example, items that are accessible to the user include those items having corresponding restricts (in their associated ACLs) that match the searcher restrict and the group restrict(s), if any, in the user's search query.

In this regard, in a search context, a restrict includes data that associates a property, e.g., authorship or interest, to content in a search index. When a user conducts an online search, one or more restricts are incorporated into the search query. A search engine matches restrict(s) in the search query to restrict(s) associated with content in the search index. When a match is found, the content is deemed relevant to the search. The restricts include one or more of the following: a searcher restrict that corresponds to (e.g., identifies) an entity (e.g., an individual, company, or singular item) who is permitted access to the item of content, and a group restrict that corresponds to (e.g., identifies) a group of entities that are permitted access to the item of content.

Following a determination that the user has access, e.g., to item 116 of private content 152, search engine 115 determines a relevancy of item 116 to search query 122. In this example, search engine 115 determines a relevance score for item 116 using content identifier 130 and search terms included in search query 122. Generally, a relevance score includes a measure of likelihood to be responsive to a search query.

In this example search engine 115 identifies items 116, 118, 120 of private content 152 as relevant to search query 122. If the private content is encrypted using a wrapped key, the processes described herein may verify that the searcher is authorized to decrypt the appropriate content, and proceed to perform the decryption. In this example that the content is decrypted, and search engine 115 generates search results for items 116, 118, 120. Generally, a search result includes information containing content from an item of information and a reference to a location of the item of information. A reference may include a link and/or a pointer from one item of information to another item of information.

Search engine 115 also searches public content index 134 for items of public content 150 that may be relevant to search query 122. For items of public content identified as relevant to search query 122, search engine 115 also generates search results for the items of public content 150. An appropriate decryption described herein may also be performed on the public content.

Search engine 115 generates search results 124 by combining search results for items of private content 152 with search results for items of public content 150 that are relevant to search query 122. Search engine 115 ranks search results 124 in accordance with relevance of search results 124 to search query 122, and sends the search results 124 to client device 104.

Figure 2:
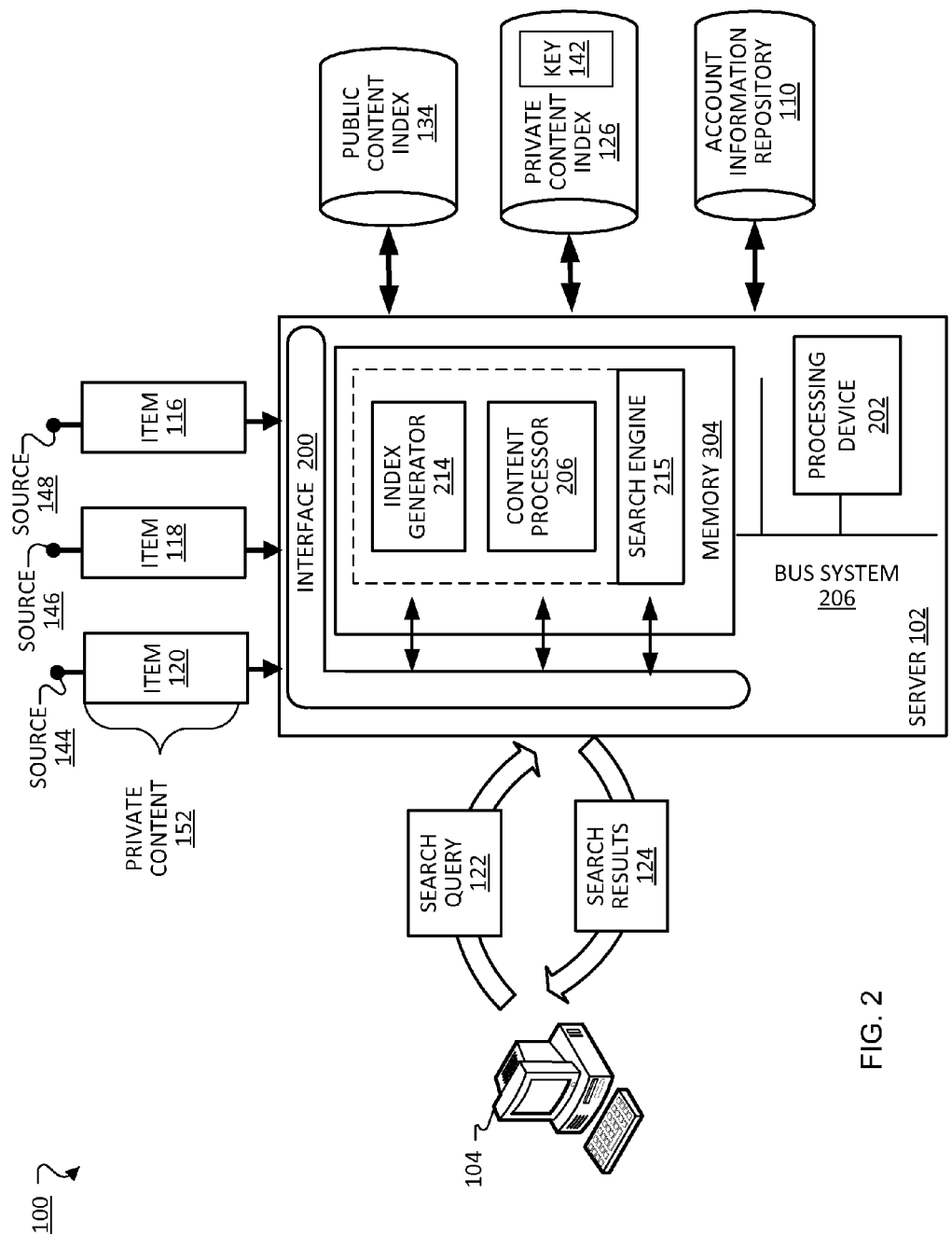
FIG. 2 is a block diagram of example hardware on which the search system of FIG. 1 may be implemented.

FIG. 2 is a block diagram of example hardware on which the search system of FIG. 1 may be implemented. In this regard, FIG. 2 shows example components of system 100 for implementing the processes described herein. In the example of FIG. 2, normalized private content 112, normalized items 160, 162, 164, index item 128, content identifier 130, ACL 132, and public content 150 are not shown.

Client device 104 can be a computing device capable of taking input from a user and of communicating over a network (not shown) with server 102 and/or with other client devices. The network can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Client device 104 can be or include a type of computing device, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance, a bus). Although a single client device 104 is shown in FIGS. 1 and 2, system 100 can include a plurality of client devices, which can be geographically dispersed.

Server 102 can be a of a variety of computing devices capable of receiving information and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations.

Client device 104 and server 102 can run programs having a client-server relationship to each other. Although distinct modules are shown in the figures, in some examples, client and server programs can run on the same device.

Server 102 can receive information from client device 104 and from sources 144, 146, 148 through input/output ("I/O") interface 200. I/O interface 200 can be a type of interface capable of receiving information over a network, e.g., an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors, computers, or processing entities, e.g., virtual machines. Generally, processing device 202 can include appropriate processor and/or logic that is capable of receiving and storing data, and of communicating over a network (not shown). Memory 204 can include a hard drive and random access memory storage, e.g., dynamic random access memory, or other types of non-transitory machine-readable storage devices. As shown in FIG. 2, memory 204 stores computer programs that are executable by processing device 202.

Figure 3:
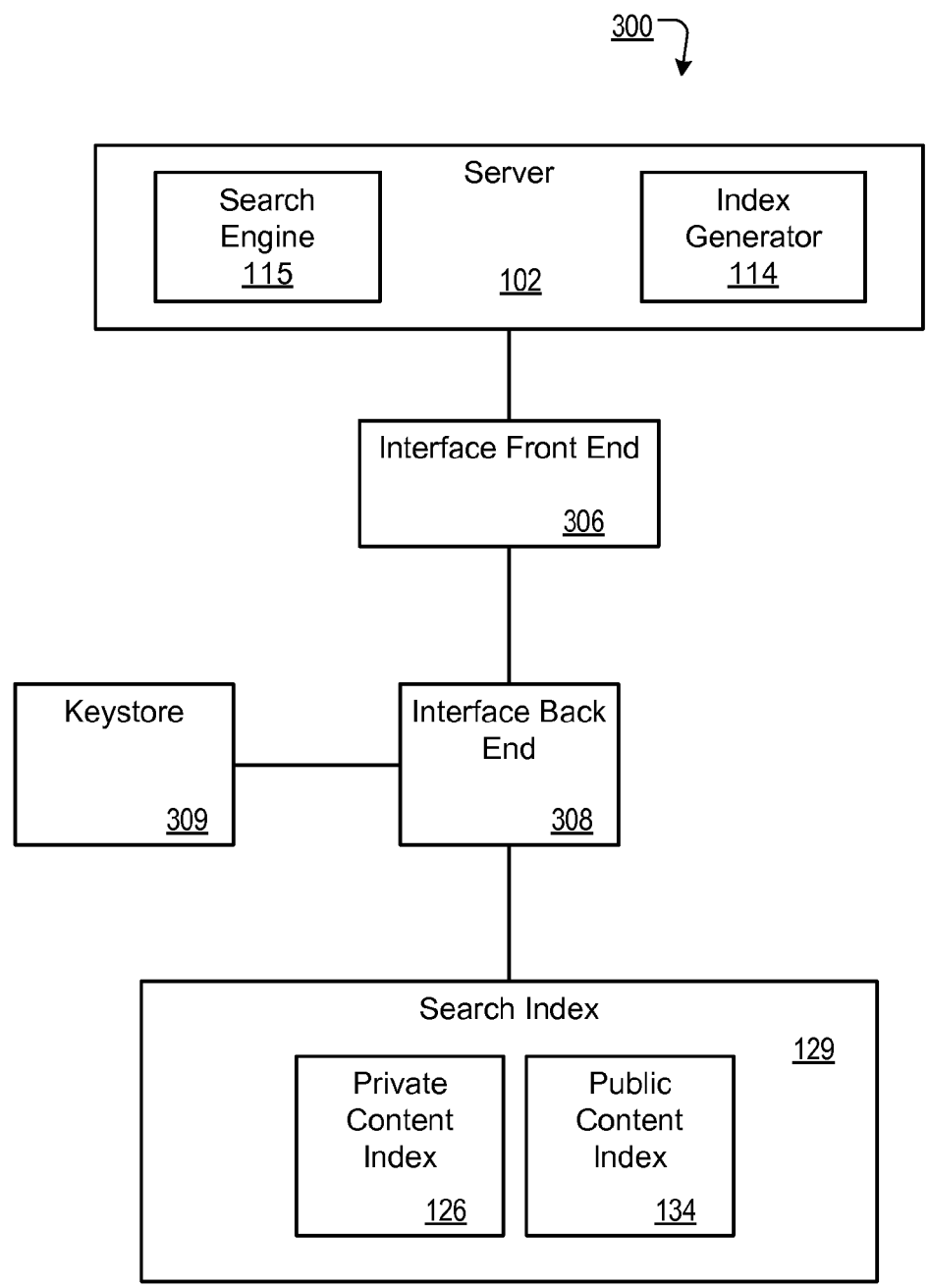
FIG. 3 is a block diagram showing an example of a system that can employ a keystore server.

Use of wrapped keys to control access to search results is noted above. Referring to FIG. 3, system 300 is an example of a system that can employ a keystore server (or simply "keystore"). More specifically, documents stored in a search index (or indexes) can be encrypted with resource encryption keys held in wrapped keys. Access to a resource encryption key can be provided by a keystore server that can ensure that a searcher has authorization to access the resource encryption key. If the searcher is so authorized, the keystore server may unwrap the wrapped key and provide the resource encryption key to the search engine (e.g., the requester of the resource). In some implementations, the keystore need not store of the wrapped keys, instead only having access to a wrapped key when receiving a request to unwrap it.

In this example, search engine 115 accesses a search index 129, which may include public content index 134 and private content index 126, along with associated information. The information may include wrapped keys and corresponding encrypted documents. Search queries input through search engine 115 may include searcher credentials for authentication and authorization. The credential may be an encrypted identifier associated with the searcher. For example, the searcher's username may be used to form the credential.

Alternatively, or additionally, a searcher can be authenticated based on credentials stored in a browser cookie, which is appended to the search query. If no valid cookie is present, a redirect to an authentication front end 306 can be generated, and the authentication front end 306 (e.g., a server) can be used to generate the browser cookie. A user can also or alternatively be authenticated based on authentication credentials from an external credentialing service or an external service that includes credentialing functionality. User or group identifier information can be calculated from the external service's credential information. Requests sent by the server 102 to the interface front end 306 can be translated and forwarded to the external service for authentication.

An interface back end 308 (e.g., a server) can handle authentication and authorization, manage data and metadata, and track activity. Interface back end 308 can provide functionality for independent front end/back end scaling for resource utilization and responsiveness under localized heavy loads. Data management can be encapsulated in interface back end 308 while communication serving can be encapsulated in interface front end 306. Interface back end 308 can isolate security mechanisms from the server 102-facing interface front end 306.

The interface back end 308 can expose an interface usable by both the interface front end 306 and other systems. In some examples, some features of the interface back end 308 are accessible only by an interface front end 306. The interface back end 308 can handle authentication (e.g., ensuring a user's credentials are valid) and authorization (e.g., verifying that a requested operation is permitted.) The interface back end can also provide encryption and decryption services to prevent unauthorized access to data.

A given ACL can be associated with a resource encryption key for an encrypted data resource associated with the ACL and stored, e.g., in search index 129. The resource encryption key itself has been encrypted by the keystore 309. The encrypted key can also carry associated metadata that is cryptographically bound to the key itself. Such keys are the wrapped keys referred to above. From the point of view of the interface back end 308, the wrapped keys can be opaque resources, e.g., resources whose content is unknown or not discernable. To obtain a resource encryption key (e.g., a cleartext key) of a wrapped key for use (e.g., to encrypt or decrypt a data resource, e.g., a search result document) the interface back end 308 can provide the wrapped key and appropriate authentication credentials to the keystore 309. The keystore 309 can verify, based in part on the wrapped key's metadata, that the provided authentication credential is sufficient to authorize release of the resource encryption key, and if so, can return the unwrapped key to the interface back end 308. The interface back end 308 can use the resource encryption key to encrypt or decrypt a resource (e.g., search document) and then can discard the resource encryption key.

In some examples, a group exercising administrative control of the interface back end 308 and a group exercising administrative control over the keystore 309 may be different. This may provide greater security for the stored data because two parties would need to cooperate to access resource encryption keys.

In some examples, the resource encryption key (e.g., the cleartext key) is a symmetric key that can be used to both encrypt and decrypt a resource. A wrapped key can have associated metadata indicating multiple users or groups authorized to access the resource encryption key.

The resource encryption key can be generated by, for example, the interface back end 308 and/or the keystore 309. For example, the interface back end 308 can generate random or pseudo-random data to use as the resource encryption key. In another example, the interface back end 308 can request a new resource encryption key from the keystore 309, and the keystore 309 can return random or pseudo-random data for use as the resource encryption key.

Alternatively, the interface back end 308 can request a resource encryption key from the keystore 309. For example, the interface back end can identify a seed value (e.g., a random or pseudo-random string of bits) from a data resource 314 to be encrypted, and send that seed value to the keystore 309. The keystore can generate a resource encryption key from the seed value, and return the resource encryption key to the interface back end.

Figure 4:
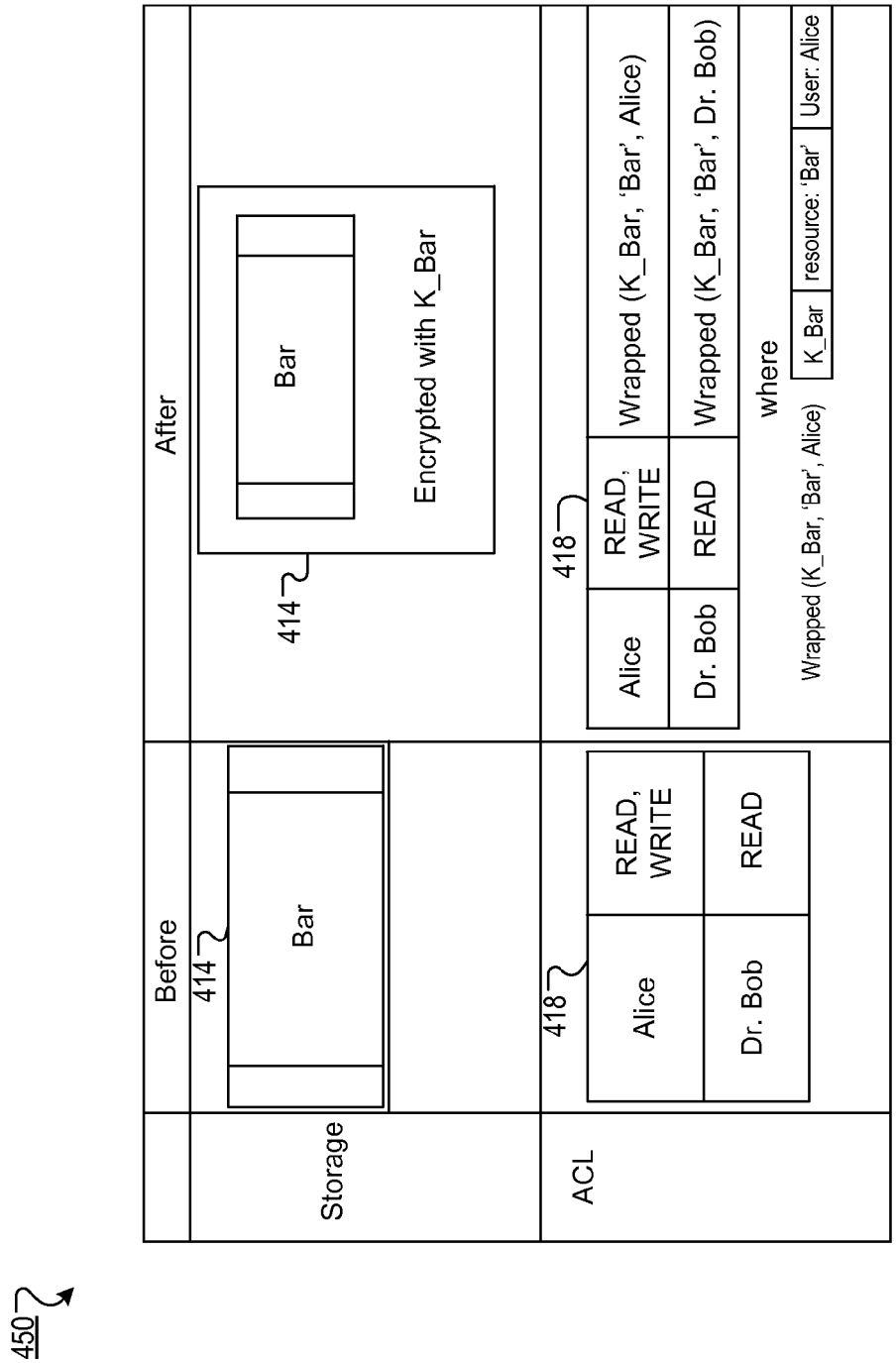
FIG. 4 is a block diagram showing an example of a wrapped key scheme.

FIG. 4 is a block diagram showing an example of a wrapped key scheme. In this regard, FIG. 4 shows an example of a wrapped key scheme 450 that may be used, for example, in the system 300. The scheme 450 provides for a system of cryptographic keys that are secret and inaccessible to the search index that stores the wrapped keys. Wrapped keys are encrypted and thus unusable in their base state. Wrapped keys are useful for granular access control. The scheme 450 permits creation and cataloging of keys at the same level of detail as access control lists used in search index(es). Wrapped keys may be stored on disk near the data that they are used to encrypt, which may provide improved performance and availability in data storage systems.

The data resource 414 in this example is a document to be indexed in search index 129. An ACL 418 is associated with the data resource 414 and describes the access permissions for the data resource 414. Here, a user "Alice" has READ and WRITE access, and a user "Dr. Bob" has READ access.

A resource encryption key, K_Bar, can be generated by, for example, the interface back end 308 or the keystore 309 and used to encrypt the data resource 414. The ACL can be modified to store a wrapped key for each user entry. Each wrapped key can contain the resource encryption key K_Bar, metadata identifying the data resource 414, and user identification information. Each of the wrapped keys is generated by the keystore 409 using a master key, K_Master.

The user identification information may be associated with a single user (e.g., Alice or Dr. Bob, as shown) or with a group of users. For example, user identification information for wrapped keys can identify users or groups from the ACL 418, along with their corresponding ability to access a resource.

The encrypted data resource 414 and ACL 418 may be stored together, for example in adjacent memory locations of a search index, which may reduce memory reading operations. Alternatively, the data resource 414 and ACL 418 may be store separately.

When one of the users, Alice or Dr. Bob, attempt to access the encrypted data resource 414, the wrapped key and the user's authentication credentials can be sent to the keystore 409. If the sent authentication credentials correspond to the user identifier (or group identifier) in the wrapped key, the keystore 409 can return the resource encryption key K_Bar in unencrypted form to the interface back end 408, and the encrypted data resource 414 can be decrypted.

Figure 5:
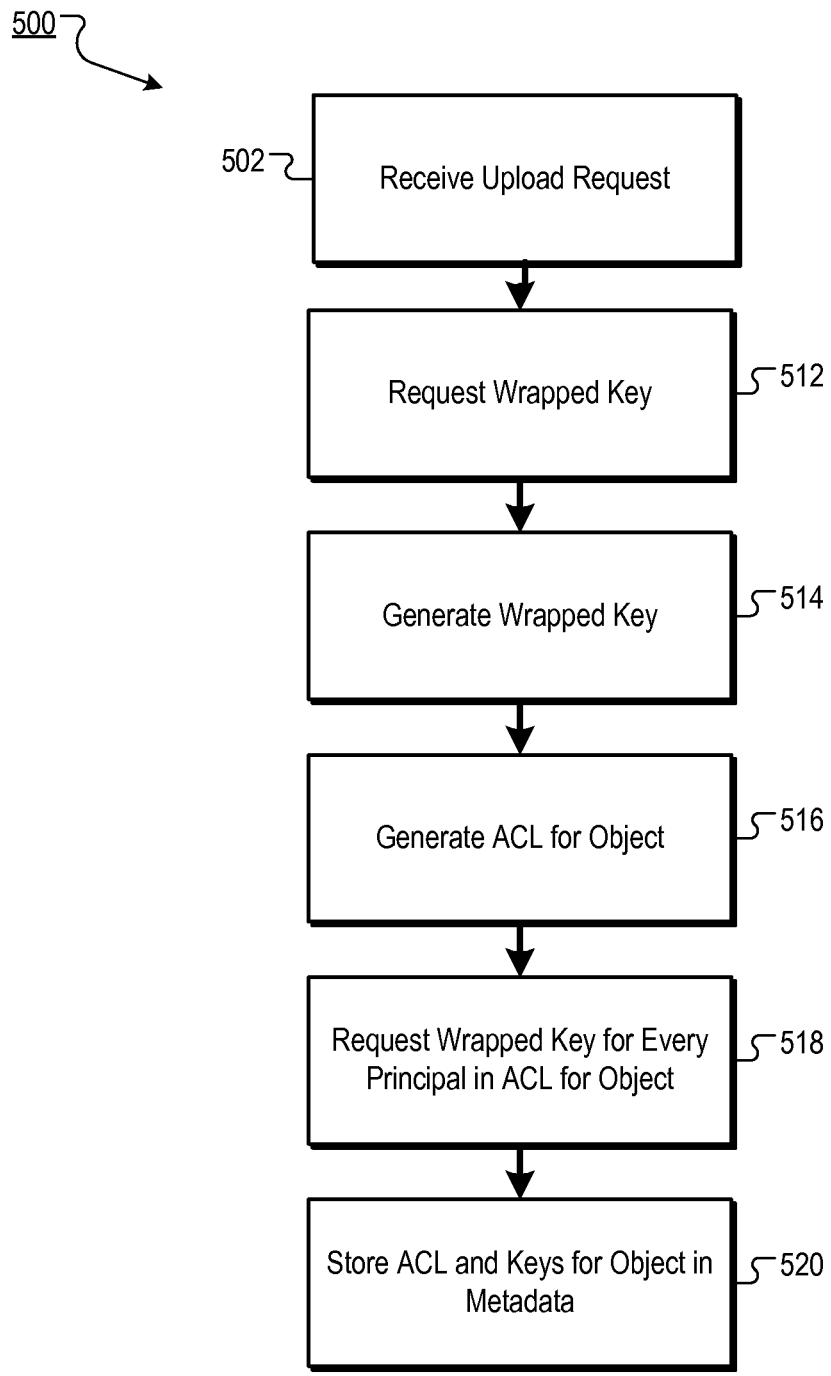
FIG. 5 is a flow chart showing an example of a process for storing documents in a search index.

FIG. 5 is a flow chart showing an example of a process for storing documents in a search index. In this regard, FIG. 5 shows an example of a process 500 for storing documents in a search index 129. The process 500 can be performed by, for example, the interface front end 306 and the interface back end 308, and for clarity of presentation, the description that follows uses the system 300 as the basis for describing the process. However, another system, or combination of systems, may be used to perform the process 500.

A request is received by the interface front end 306, e.g., from the index generator 114 to store data for a resource (502) in search index 129. The request may include a HTTP PUT or POST request, a data resource (e.g., a document to store in the search index), and a target for the resource (e.g., private content index 126 or public content index 134), and a name of the data resource.

The interface back end 308 can encrypt the resource using a resource encryption key. In some examples, the interface back end 308 can perform this encryption before or after uploading data for the resource to the search index. The interface back end 308 can generate the resource encryption key, for example by sampling a pseudo-random number generator or calculating a hash value of data e.g., the resource or an input stream. Alternatively, the interface back end can generate a seed value and request a resource encryption key from the keystore 109 based on that seed value (e.g., an arbitrary bit string).

The interface back end 308 generates a new resource key request to the keystore 109 for a wrapped key for the newly-uploaded resource (512). The request can include the resource encryption key and a resource identifier for the newly-uploaded resource. The keystore 109 generates and encrypts a wrapped key (514) and can provide the wrapped key to the interface back end 308. The wrapped key can include the resource encryption key and resource identifier.

The interface back end 308 generates an ACL 118 representing the access control list for the newly created resource (516). In some examples, a default ACL 118 is used or an ACL 118 can be specified by index generator 114. In some implementations, the ACL may be part of the wrapped key. In other implementations, the ACL may be associated with the wrapped key.

The interface back end 308 generates a new wrapped key request to the keystore 109 for a wrapped key for every entity (user or group) in the ACL with permissions to read the resource or modify the resource's ACL (518). Which user's or groups are permitted access may be defined by corresponding user or group restricts in the ACL. Each new wrapped key may be tied to a single entity (user or group), and may contain the resource identifier and resource encryption key used to encrypt the resource.

For example, the request received by the interface front end 306 from the server 102 may indicate one or more other entities that should have shared access to the resource. The interface back end 308 stores the resource's ACL and wrapped keys in the resource's metadata (520) in the search index. The resource encryption key or keys can be discarded by the interface back end 308.

Figure 6:
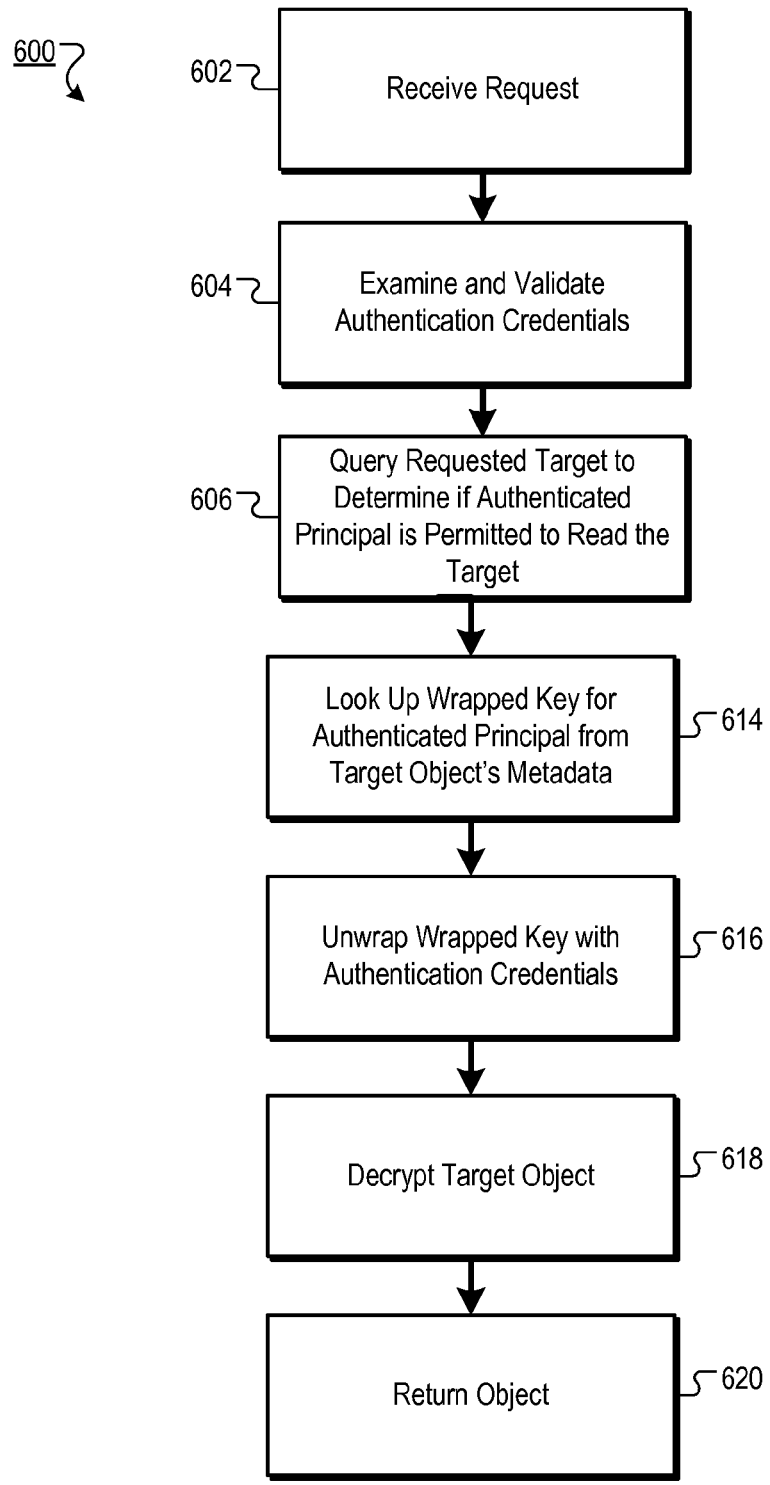
FIG. 6 is a flow chart showing an example of a process for providing search results from the search index.

FIG. 6 is a flow chart showing an example of a process for providing search results from the search index. In this regard, FIG. 6 shows an example of a process for providing data from search index 129 in response to a request from search engine 115. The process 600 can be performed by, for example, the interface front end 306 and the interface back end 308, and for clarity of presentation, the description that follows uses the system 300 as the basis for describing the process. However, another system, or combination of systems, may be used to perform the process 600.

A request is received by the interface front end 306 from search engine 115 to retrieve a resource (602). The request can include, e.g., an HTTP GET request, an authentication credential that authenticates the entity who conducted a search on search engine 115, and a target that includes an index (and optionally data resource) name. In some examples, the authentication credentials can include an interoperable authentication header, token, or cookie. The interface front end can make an RPC to the back end 308 including the request headers.

The interface back end 308 examines and validates the authentication credentials included in the request (604). For example, native credentials (e.g., user ID, token) can be validated using internal validation features of the search system. External credentials (e.g., user names and passwords for another system) can be sent to the appropriate system for validation.

The interface back end 308 may query the resource ACL to determine if the authenticated entity is permitted to read the target (606) which, in this case, is the indexed search content. For example, the entity or a group the entity is a member of can have a READ, WRITE or FULL_CONTROL role assigned in the ACL, which would allow the entity to read or otherwise access the target. If the entity is not authorized to read or access the resource, the request is denied.

If the entity is authorized to access the target, the interface back end 308 looks-up the appropriate wrapped key for the given authenticated requestor from the resource's metadata (614). The interface back end 308 sends the wrapped key and the authentication credentials to the keystore 109, which can return the decrypted resource encryption key to the interface back end 308 (616). The interface back end 308 can fetch and decrypt the target resource (618), which is thereafter returned to search engine 115 (620).

In other implementations, the interface back end 308 sends the wrapped key and the authentication credentials to keystore 109. Keystore 109 uses the master key to decrypt the wrapped key to obtain the resource encryption key and the ACL for the corresponding resource. Keystore 109 checks the authentication credential against the ACL to determine if the credential is in the ACL and, therefore, if the entity is authorized to access the target. If the entity is not authorized to access the target document, then the request is rejected. If the entity is authorized to access the target, keystore 109 returns, to the interface back end 308, the resource encryption key and the ACL for the target document. The interface back end 308 may decrypt the target document using the resource encryption key, or it may pass the resource encryption key to the search engine to decrypt the target document.

Figure 7:
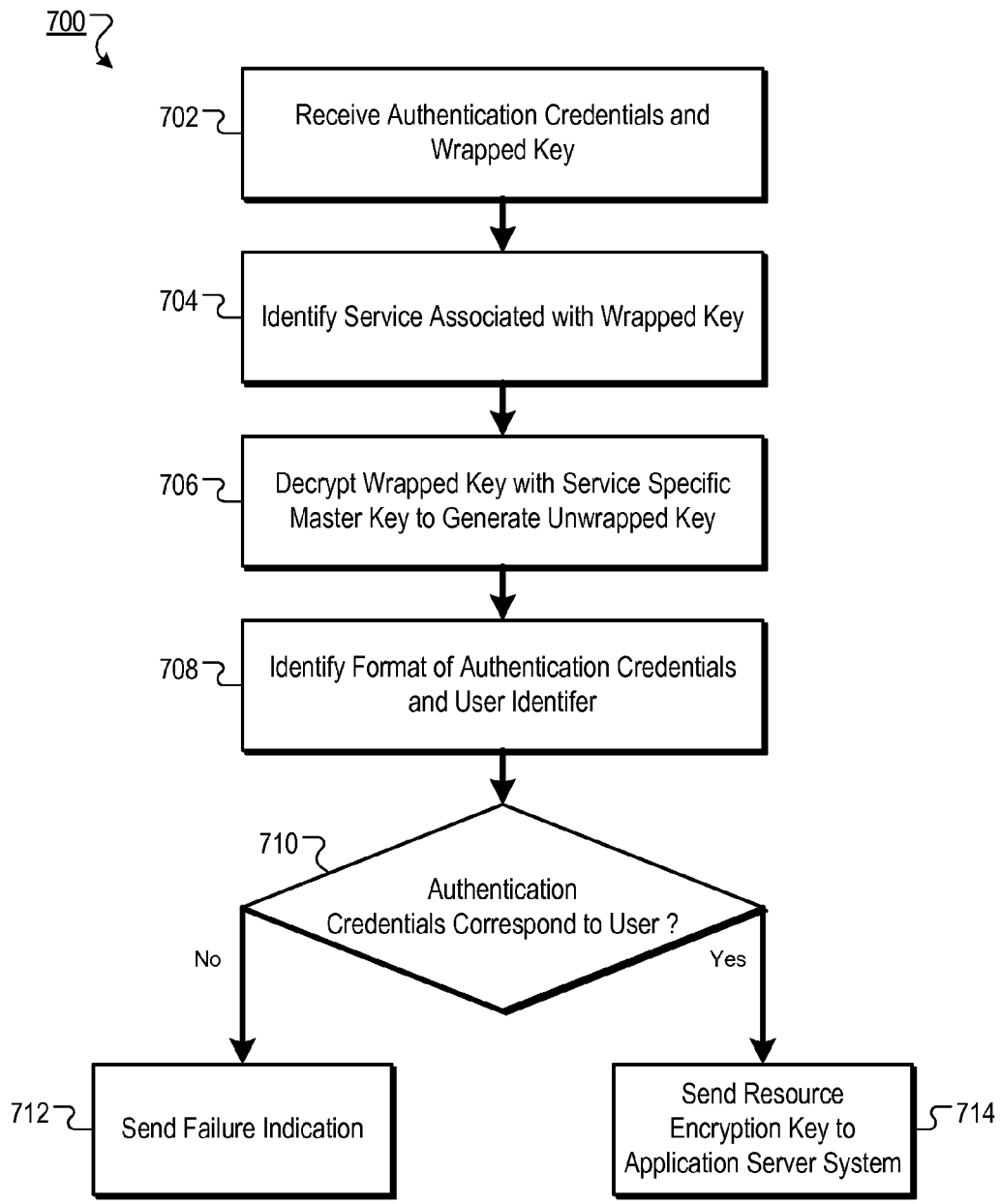
FIG. 7 is a flow chart showing an example of a process for unwrapping a wrapped key.

FIG. 7 is a flow chart showing an example of a process for unwrapping a wrapped key. In this regard, FIG. 7 is a flow chart shows an example of a process 700 for unwrapping a wrapped key. The process 700 can be performed by, for example, the keystore 109, and for clarity of presentation, the description that follows uses the system 100 and the scheme 450 as the basis for describing the process. However, another system, or combination of systems, may be used to perform the process 700.

Authentication credentials and a wrapped key are received at a key server system from a server system (702). For example, the keystore 109 can receive authentication credentials and a wrapped key from the interface back end 308. The authentication credentials can specify one or more users, and may take the form of a variety of formats. In one or more implementations, wrapped keys may contain data that is only accessible by a search engine that provides valid authentication credentials—in this example, the credentials of a searcher.

The wrapped key includes a resource identifier, a resource encryption key, and a user identifier that have been encrypted using a master key. The resource identifier identifies a resource (e.g., an indexed document) encrypted with the resource encryption key and the user identifier identifies a user that is permitted to use the resource encryption key to decrypt the resource. For example, the resource identifier can describe a resource with which the resource encryption key is associated. In this example, a resource ID is an example of a resource identifier. The resource encryption key can be the cryptographic key that has been, or will be, used to encrypt the resource identified by the resource identifier. For the example wrapped keys, the resource encryption key is K_Bar, the resource identifier is "Bar", and the user identifier is either Alice or Dr. Bob.

In some implementations, the authentication credentials are a character string embedded in a uniform resource identifier (URI). For example, some user authentication schemes can produce a unique character string for an authorized user. A service associated with the wrapped key is identified (704). For example, in addition to a wrapped key and authentication credentials, a service identifier may be received. The wrapped key is decrypted with a master key associated with the service (706). For example, the keystore 109 may store a collection of master keys, one per service, which are used for encrypting and decrypting the wrapped keys associated with a single service. After identifying the service (in this example, a search service), the keystore 109 may access, based on the identified service, the master key associated with the identified service and use the master key to decrypt the wrapped key to produce the resource encryption key and, in some instances, the resource ACL. For instance, keystore 109 may identify, based on the identified service, the master key associated with the service, access the identified master key, and use the accessed master key to decrypt the wrapped key. Likewise, when wrapping keys, keystore 109 may identify the service, identify, based on the identified service, the master key associated with the service, access the identified master key, and use the accessed master key to wrap the key. In other implementations, the same master key may be used for different services.

The format of the authentication credentials and user identifier are identified (708). The keystore 109 may recognize many authentication formats, and the search system may use one or more of those formats to authenticate users and identify entities in the ACLs. For example, the search system may use its own native authentication system, and may also allow users of a third party authentication system use credentials from that third party authentication system. In this example, entries in the ACLs and in wrapped keys may be in either the native or third party format. The keystore 109 may, as a preliminary authentication action, determine that the format of the authentication credentials and the user identifier are the same or compatible. The keystore 109 determines if the received authentication credentials correspond to the accessed user identifier (710).

In some examples, there are different types of users in the ACL (e.g., internal network members, external network members, and so forth). These different types of users can be authenticated (710) independently using different methods, which may be the same across the different types of users in the ACL.

In other examples, the keystore 109 may use the identified format to determine the processes needed to compare the authentication credentials and user identifier. For some formats, the keystore 109 can provide the authentication credentials and user identifier to a third party authentication system and receive an indication of correspondence. For some other formats, the keystore 109 can perform the determination directly by selecting a format-appropriate comparison function, and using the authentication credentials and user identifier as parameters for the function. For example, some formats of authentication credentials and user identifier may be comparable by determining if both include the same data (e.g. character string, cookie). If both include identical data, then they can be considered to correspond. Some formats may require some pre-processing of the authentication credentials and/or user identifier, for example to convert the authentication credentials into the format of the user identifier, or vice-versa.

In some implementations, the user identifier may indicate no more than one user. For example, in the ACL of FIG. 4, each wrapped key user identifier indicates only one user, Alice or Dr. Bob. In this case, when more than one user is able to access the data resource 414, multiple wrapped keys, one for each user, are stored in the ACL 418.

In some implementations, after a user is authenticated based on their credentials, it is then determined if the user is in a group based, e.g., on information contained in a database in the keystore or elsewhere.

If the received authentication credentials do not correspond to the accessed user identifier, a failure indication is sent (712). For example, the keystore 109 can return to the interface back end 308 an error or failure message that specifies that the authentication credentials do not match the user identifier in the received wrapped key.

If the received authentication credentials do correspond to the accessed user identifier, the resource encryption key is sent in unencrypted form to the search engine (714). For example the keystore 109 can transmit to the interface back end 308 the resource encryption key in unencrypted form. The interface back end 308 can then use the resource encryption key, e.g., described in the processes 500 and 600. In some implementations, communication between the keystore 109 and the interface back end 308 can use an encrypted transfer protocol e.g., Transport Layer Security (TLS) so that the encryption key is encrypted in transport.

Figure 8:
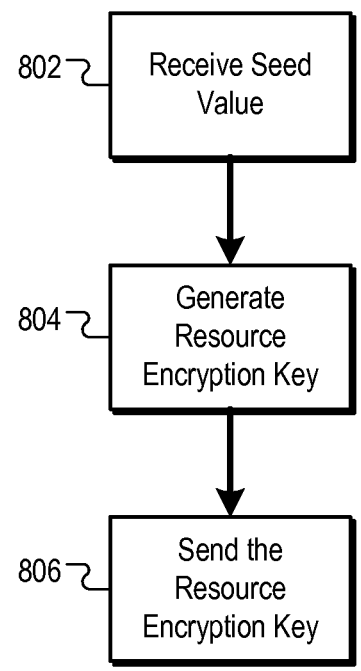
FIG. 8 is a flow chart showing an example of a process for creating a resource encryption key from a seed value.

FIG. 8 is a flow chart showing an example of a process 800 for creating a resource encryption key from a seed value. The process 800 can be performed by, for example, the keystore 109, and for clarity of presentation, the description that follows uses the system 300 and the scheme 450 as the basis for describing the process. However, another system, or combination of systems, may be used to perform the process 800.

A seed value is received from the search system (802). For example, the interface back end 308 can send a seed value to the keystore 109. The seed value can be based on data available to the interface back end 308 and/or arbitrary data. For example, for use in encrypting user preferences, the interface back end 308 can use some data relating to each user as a seed value for a wrapped key for each user's preferences. Additionally, an arbitrary character string can be appended to the seed data by the interface back end 308. In another case, the seed can be based on the resource that is to be encrypted. For example, the interface back end 308 can send a copy of the resource to the keystore 109 to be used as a seed value, or a hash of the resource may be calculated by the interface back end 308 and send to the keystore 109 to be used as a seed value.

The resource encryption key is generated from the seed value (804). For example, the keystore 109 can use the seed value and a master key as parameters to a pseudo random function, e.g., a keyed cryptographic hash function, to generate a resource encryption key. Most or all one-way functions that can be used to generate the resource encryption key are deterministic algorithm. In this case, the keyed cryptographic hash function is deterministic, the resource encryption key is determined by the seed value, and a set of wrapped keys with identical seed values will also have identical resource encryption keys.

The resource encryption key is sent to the application server system (806). For example, the keystore 109 can return the newly generated resource encryption key to the interface back end 308 for use in encrypting data resources 114.

Figure 9:
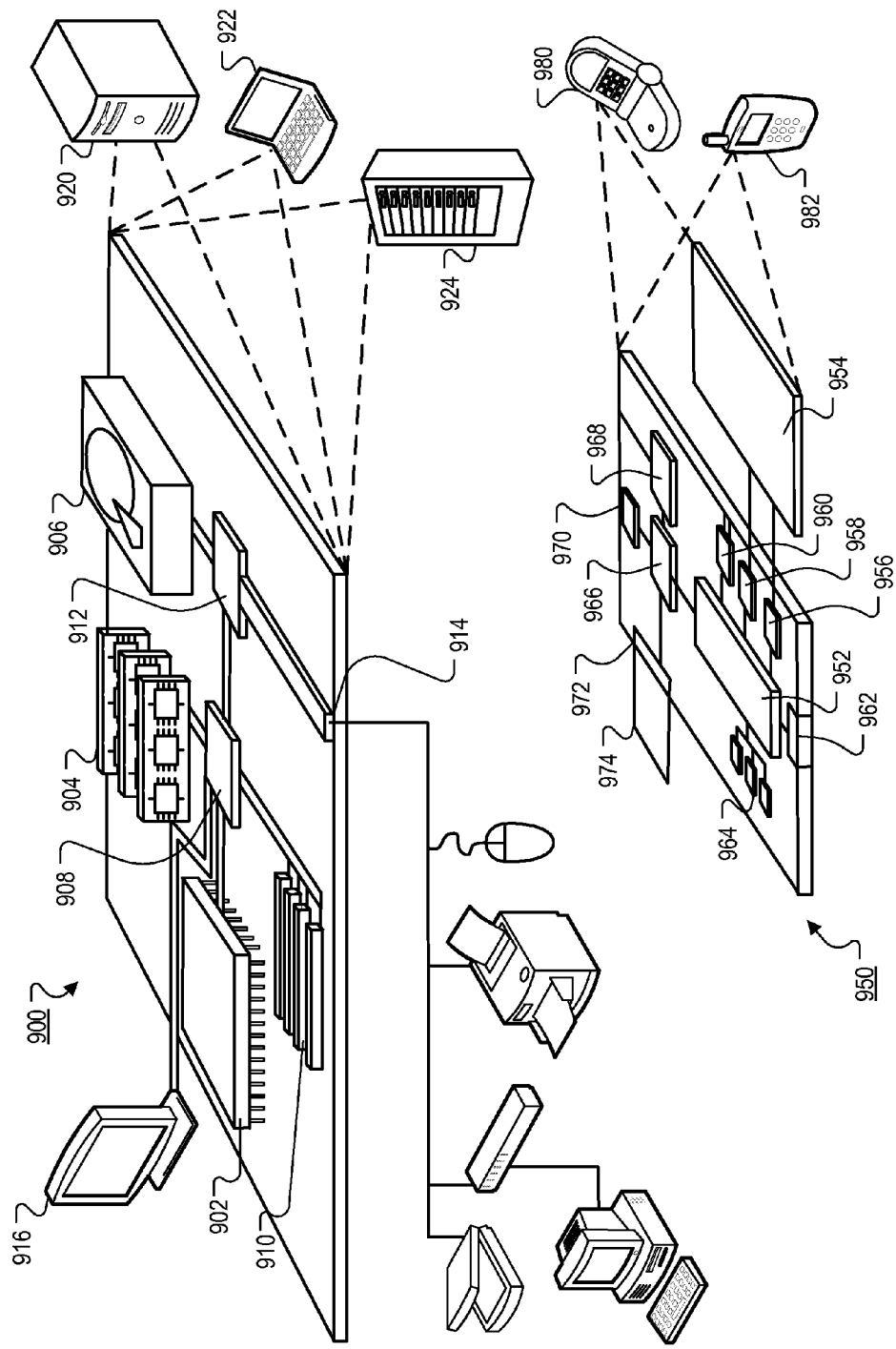
FIG. 9 shows examples of computing devices on which the processes described herein, or portions thereof, may be implemented.

FIG. 9 shows examples of computing devices on which the processes described herein, or portions thereof, may be implemented. In this regard, FIG. 9 shows an example of a generic computing device 900 and a generic mobile computing device 950, which may be used to implement the processes described herein or portions thereof. For example, server 202 and associated index(es) may be implemented on computing device 900. Mobile computing device 950 may represent a client device 204 of FIGS. 2 and 3. Other devices (e.g., servers) of FIGS. 1 to 3 may also have the architecture of computing device 900.

Computing device 900 is intended to represent various forms of digital computers, examples of which include laptops, desktops, workstations, personal digital assistants, servers, blade servers, mainframes, and other appropriate computers. Computing device 950 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, for example, display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, examples of which include a magnetic or optical disk.

The storage device 906 is capable of providing mass storage for the computing device 900. In one implementation, the storage device 906 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 904, the storage device 906, or memory on processor 902. For example, the information carrier may be a non-transitory, machine-readable storage medium.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer, e.g., a laptop computer 922. Alternatively, components from computing device 900 may be combined with other components in a mobile device (not shown), e.g., device 950. Each of such devices may contain one or more of computing device 900, 950, and an entire system may be made up of multiple computing devices 900, 950 communicating with each other.

Computing device 950 includes a processor 952, memory 964, an input/output device, e.g. a display 954, a communication interface 966, and a transceiver 968, among other components. The device 950 may also be provided with a storage device, e.g., a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, e.g., control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, e.g., using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, e.g., through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein determine personal or private information about users, the users may be provided with an opportunity to enable/disable programs or features that may determine personal or private information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results.

Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Other implementations not specifically described herein are also within the scope of the following claims.

What is claimed is:

1. A method performed by one or more processing devices, comprising:
   for each document of a plurality of documents for inclusion in a search index of a search system:
      receiving the document, the document having an associated access control list (ACL), the ACL comprising data for use in restricting access to the document to users of the search system having credentials that match corresponding data in the ACL;
      generating, by one or more processors, a first key based on i) a seed value and ii) a second key, the seed value based on the document;
      encrypting the document using the first key to produce an encrypted document;
      generating, by the one or more processors, a wrapped key for the document by encrypting both the first key and the ACL using the second key, the wrapped key including a user identifier that identifies one or more users that are permitted to use the first key;
      storing, in the search index, the encrypted document in association with the wrapped key and an identifier for the document;
   receiving i) a search query and ii) an authentication credential associated with a particular user providing the search query;
   in response to receiving the search query, identifying one or more documents of the plurality of documents based on the search query;
   for each of the one or more identified documents, decrypting the wrapped key using the second key to produce the first key and the ACL for the identified document;
   determining, by the one or more processors, that the particular user is authorized to access a subset of the one or more identified documents based on, for each identified document, the authentication credential corresponds to the user identifier associated with the identified document;
   based on the determining, decrypting each of the subset of the one or more identified documents using the first key associated with the corresponding identified document; and
   providing search results to the particular user including content associated with the subset of the one or more identified documents.

2. The method of claim 1, wherein determining comprises examining the ACL to determine that the particular user corresponds to the authentication credential, or a group of which the particular user is a member, appears in the ACL.

3. The method of claim 1, further comprising:
   determining that the particular user is not authorized to access the subset of the one or more identified documents, and in response, excluding content associated with the subset of the one or more identified documents from search results returned in response to the search query.

4. The method of claim 1, wherein generating the first key further comprising generating the first key from a random or pseudo-random data.

5. The method of claim 1, wherein, for each document of the plurality of documents, the second key is a master key that is usable to encrypt the document associated with a single service,
   the method further comprising confirming that the document is associated with the single service.

6. A method performed by one or more processing devices, comprising:
   receiving i) a search query and ii) an authentication credential associated with a particular user;
   in response to receiving the search query, identifying one or more documents in a search index based on the search query, each document of the one or more documents encrypted using a respective resource encryption key, and stored in association with a respective wrapped key comprising data used to decrypt the document, the wrapped key including a user identifier that identifies one or more users that are permitted to use the resource encryption key, the resource encryption key for each document of the one or more documents based on i) a seed value and ii) a master key, the seed value based on the document;
   for each of the one more identified documents, decrypting the respective wrapped key using the master key to produce the resource encryption key and an access control list (ACL) associated with the document;
   determining that the credential corresponds to the user identifier, and in response, providing the decrypted wrapped key that includes the resource encryption key to the search system;
   determining that the particular user is authorized to access a subset of the one or more identified documents based on, for each identified documents, the authentication credential corresponds to the user identifier associated with the identified document;
   based on the determining, decrypting each of the subset of the one or more identified documents using the resource encryption key associated with the corresponding identified document; and
   providing search results to the particular user including content associated with the subset of the one or more identified documents.

7. The method of claim 6, the method further comprising:
   determining that the particular user is not authorized to access the subset of the one or more documents, and in response, excluding content associated with the subset of the one or more identified documents from search results returned in response to the search query.

8. The method of claim 6, wherein the authentication credential comprises an encrypted identifier associated with the particular user.

9. One or more non-transitory machine-readable media comprising instructions that are executable to perform operations comprising:
   for each document of a plurality of documents for inclusion in a search index of a search system;
      receiving the document, the document having an associated access control list (ACL), the ACL comprising data for use in restricting access to the document to users of the search system having credentials that match corresponding data in the ACL;

generating a first key based on i) a seed value and ii) a second key, the seed value based on the document;

encrypting the document using the first key to produce an encrypted document;

generating a wrapped key for the document by encrypting both the first key and the ACL using the second key, the wrapped key including a user identifier that identifies one or more users that are permitted to use the first key; and storing, in the search index, the encrypted document in association with the wrapped key and an identifier for the document;

receiving i) a search query and ii) an authentication credentials associated with a particular user providing the search query;

in response to receiving the search query, identifying one or more documents of the plurality of documents based on the search query;

for each of the one or more identified documents, decrypting the wrapped key using the second key to produce the first key and the ACL for the identified document;

determining that the particular user is authorized to access a subset of the one or more identified documents based on, for each identified document, the authentication credentials correspond to the user identifier associated with the identified document;

based on the determining, decrypting each of the subset of the one or more identified documents using the first key associated with the corresponding identified document; and providing search results to the particular user including content associated with the subset of the one or more identified documents.

10. The one or more non-transitory machine-readable media of claim 9, wherein determining comprises examining the ACL to determine that the particular user corresponds to the authentication credential, or a group of which the particular user is a member, appears in the ACL.

11. The one or more non-transitory machine-readable media of claim 9, wherein the operations further comprise:

determining that the particular user is not authorized to access the subset of the one or more identified documents, and in response, excluding content associated with the subset of the one or more identified documents from search results returned in response to the search query.

12. The one or more non-transitory machine-readable media of claim 9, wherein generating the first key further comprises generating the first key from a random or pseudo-random data.

13. The one or more non-transitory machine-readable media of claim 9, wherein, for each document of the plurality of documents, the second key is a master key that is usable to encrypt the document associated with a single service, the operations further comprising confirming that the document is associated with the single service.

* * * * *